(12) United States Patent
Määttä et al.

(10) Patent No.: US 8,545,203 B2
(45) Date of Patent: *Oct. 1, 2013

(54) MOULD SYSTEM FOR MANUFACTURING A CONTAINER

(75) Inventors: Päivi Määttä, Imatra (FI); Panu Tanninen, Rauha (FI); Olavi Pirttiniemi, Järvelä (FI); Noora Nylander, Lahti (FI); Jalliina Järvinen, Lahti (FI); Teemu Karhu, Imatra (FI)

(73) Assignee: Stora Enso Oyj, Helsinki (FI)

( * ) Notice: Subject to any disclaimer, the term of this patent is extended or adjusted under 35 U.S.C. 154(b) by 111 days.

This patent is subject to a terminal disclaimer.

(21) Appl. No.: 12/863,963

(22) PCT Filed: Aug. 12, 2009

(86) PCT No.: PCT/FI2009/050660
§ 371 (c)(1), (2), (4) Date: Jul. 21, 2010

(87) PCT Pub. No.: WO2010/018309
PCT Pub. Date: Feb. 18, 2010

(65) Prior Publication Data
US 2010/0295209 A1    Nov. 25, 2010

(30) Foreign Application Priority Data
Aug. 12, 2008  (FI) .................................... 20080461

(51) Int. Cl.
*B29C 44/14*  (2006.01)

(52) U.S. Cl.
USPC ........... 425/112; 425/412; 425/414; 425/416; 425/451.9; 264/266

(58) Field of Classification Search
USPC .......................................... 425/395; 264/255
See application file for complete search history.

(56) References Cited

U.S. PATENT DOCUMENTS 3,436,008 A * 4/1969 Santangelo .................. 229/406
4,705,471 A * 11/1987 Shah et al. .................... 425/195

(Continued)

OTHER PUBLICATIONS

International Search Report issued in PCT/FI2009/050660 and dated Dec. 30, 2009.

(Continued)

*Primary Examiner* — Robert J Grun
(74) *Attorney, Agent, or Firm* — Birch, Stewart, Kolasch & Birch, LLP (57) ABSTRACT

A mould system for manufacturing a container which includes a movable mould half and a stationary mould half which are positioned opposite to each other, wherein the movable mould half includes a core plate provided with a core, a plate-like seal ring that is movable relative to the core, a seal surface which surrounds the core, and a collar ring that is movable relative to the core and the stationary mould half includes a mould plate provided with a mould cavity and a seal surface, wherein in the mould system, a plate-like insert is connected to the seal surface of the seal ring, the insert including a recess which is in contact with a front edge of the seal surface, so that it is in flow communication with molten plastic material flowing from the direction of the collar ring.

8 Claims, 11 Drawing Sheets

(56) References Cited

U.S. PATENT DOCUMENTS

| | | |
|---|---|---|
| 5,425,972 A | 6/1995 | Calvert |
| 2002/0110615 A1 | 8/2002 | Ciccone et al. |
| 2005/0159284 A1 | 7/2005 | Smith et al. |
| 2007/0210092 A1 | 9/2007 | Mazzarolo |
| 2007/0267374 A1 | 11/2007 | Middleton et al. |

OTHER PUBLICATIONS

Search Report issued in corresponding Finnish application No. 20080461, dated Apr. 29, 2010.

* cited by examiner

MOULD SYSTEM FOR MANUFACTURING A CONTAINER

The invention relates to a mould system according to the preamble of Claim 1, including a movable mould half and a stationary mould half, which mould halves are located opposite to each other; the mould system can be used to manufacture a container that comprises a bottom, which is pressed from a cardboard blank, walls that are connected to the bottom and a (plastic) rim that is at least partly moulded of plastic and connected to the upper edge of the walls, encircling the walls.

In food industry, in particular, so-called tray packages are used as storage packages, consisting of lidded containers that have a bottom, walls that encircle the bottom and extend upwards and a rim that encircles the upper edge of the walls and extends outwards. The container is closed with a lid that is connected to the rim. In such containers, the material of the container bottom and walls often comprises cardboard, on top of which plastic and/or metal layers may be added, which change the steam and/or oxygen transmission properties of the cardboard, depending on the application.

Generally, such a so-called tray package is used for storing foodstuffs, whereby it is closed hermetically by the lid. To be able to attach the lid to the package, the edge of the container that is used as tray package must be provided with a horizontal rim, which protrudes from the upper end of the side walls and encircles the package. On the upper surface of the rim, there is usually a suitable coating, by means of which the lid can be fastened tightly to the package. For example, it is very common to use heat-sealable plastic materials for fastening the lid part to the package. As examples of food packages and packaging materials used therein, among others, the patent specifications WO-03/033258, EP-1289856, WO00/21854 and U.S. Pat. No. 5,425,972 could be mentioned.

Such a container with the shape of a tray, comprising a bottom pressed from a cardboard blank, walls connected to the bottom and a rim that is at least partly cast of plastic and connected to the upper edge of the walls, encircling the walls, can be formed by various methods. The published application FI 20070973 describes a manufacturing method of a tray package, wherein the container is formed from a straight cardboard blank by pressing to shape in a mould system, which includes a moving mould half and a stationary mould half, which are located opposite to each other, whereby the mould half that is movable with respect to the stationary mould half includes at least a core plate provided with a core, a plate-like seal ring, which is movable with respect to the core, comprises a seal surface and surrounds the core, and a collar ring, which can be moved with respect to the core and the seal ring and fitted between the same, and which can be used to form the rim on the container; and the stationary mould half includes at least a mould plate provided with a mould cavity and a seal surface.

A cardboard blank that is pressed to shape by such a mould system is brought on the mould cavity of the stationary mould half, the core of the moving mould half settles into the mould cavity, and the cardboard blank remaining between the core and the mould cavity is moulded into a container with the shape of a tray. At the end stage of the compression moulding, a rim that extends sideways is cast of a plastic material on the upper part of the side walls of the package, when the mould is kept closed in such a way that a mould cavity corresponding to the rim is formed by moving a counter surface inside the mould system backwards from a surface opposite to it, after which the casting material is introduced into the mould cavity. In the cavity, the material solidifies into a fixed rim, after which the mould is opened and the finished container-shape package is removed from the mould.

With the above prior art as basis, the object of the applicant was to provide a more versatile manufacturing method of tray packages, wherein the same mould system could be used to manufacture different containers that are used as tray packages and wherein the dimensions of the rim could change, the rim could be provided with various functional or decorative formations, such as ridges that encircle the rim for attaching the lid to the rim, or with projections of the basic rim, which can comprise suspension means, such as openings.

Surprisingly, it has now been observed that by modifying the seal ring or the collar ring of the mould system described above by means of various inserts, which are detachably attached to the seal surface of the seal ring or the collar of the collar ring, the dimensions and shapes of the rim can be modified as desired.

To be more precise, the invention relates to a mould system according to Claim 1 for manufacturing a container. Such a mould system includes a movable mould half and a stationary mould half, which are located opposite to each other; the mould system can be used to manufacture a container, which comprises a bottom that is pressed from a cardboard blank, walls that are connected to the said bottom and a rim that is at least partly cast of plastic and connected to the upper edge of the walls, encircling the walls, whereby the mould half that is movable with respect to the stationary mould half includes at least a core plate provided with a core, a plate-like seal ring that is movable with respect to the core and comprises a seal surface and surrounds the core, and a collar ring, which is movable with respect to the core and to the seal ring and can be fitted between the same, and the stationary mould half includes at least a mould plate provided with a mould cavity and a seal surface. In the mould system, on top of the basic collar of the collar ring of the movable mould half of the mould system, there is detachably attached a raising collar, on the seal surface of which there are grooves or recesses that are lower than the rest of the plane of the said seal surface, whereby on the surface or in the recesses of the seal ring, there can be bulges or embossed patterns that are on the plane of the seal surface or, possibly, slightly extend upwards from the same; and the grooves or recesses and the bulges or embossed patterns that are in these recesses and grooves can be used to provide, on the plastic rim of the container, ridges or bulges that extend upwards from the rest of the plane of the said rim, grooves or recesses, which are between the ridges and bulges on the plane of the rim or slightly lower than the rest of the plane of the rim and which possibly comprise embossed patterns or bulges.

In this context, the basic rim refers to the plastic rim, which encircles the upper edge of the container wall and protrudes from the upper edge and which can be manufactured by the method disclosed in the published application FI 20070973.

In the method according to the invention, the cardboard blank is pressed between the core and the mould cavity to make the container bottom and the walls that encircle the bottom, after which the flange-like rim that encircles the walls is formed by casting on the upper edge of the walls by introducing molten plastic into the casting cavity, which is limited by the seal surface of the mould plate, the seal surface of the seal ring and the seal surface of the collar ring, whereby the shape and/or dimensions of the casting cavity are changed by arranging, on the basic collar of the collar ring, a raising collar, which is detachably attached and which changes the function of the collar ring and by which the dimensions of the container basic rim are changed, or the surface of the said basic rim is provided with bulges that extend slightly upwards from the rest of the plane of the rim, or projections are formed, which project further from the outer edge of the container basic rim and possibly comprise suspension means, such as openings.

The invention is based on the fact that, depending on the changes that are to be made on the plastic rim of the cardboard-based container that comprises bottom and walls, a raising collar is detachably attached to the seal surface of the collar ring of the movable mould half, changing the function and/or shape of the seal surface. When the molten plastic is conveyed to the mould cavity at the manufacturing stage of the container rim, the raising collar changes the shape and dimensions of the mould cavity, so that similar changes are correspondingly made on the rim of the container that is manufactured.

By using the detachable raising collar, the shape and dimensions of the rim can be changed considerably quicker than by replacing the entire collar ring with another one. In this way, the mould system becomes modular and changes are easy and simple to make without changing the operation of the entire mould system.

In another preferred embodiment of the invention, a raising collar is detachably attached on top of the basic collar of the collar ring of the movable mould half of the mould system, its seal surface comprising bulges, which slightly rise from the rest of the plane of the said seal surface, and embossed patterns or bulges that are placed in the recess on the seal surface and extend to the plane of the seal surface, at the most, or recesses or grooves that are lower than the rest of the plane of the seal surface; the bulges, embossed patterns, recesses or grooves making it possible to provide, on the container plastic rim, bulges that slightly rise from the rest of its plane, grooves and depressions between the bulges, and embossed patterns in these depressions.

In the following, the invention is illustrated in detail by the appended figures.

In the following, the mould system 1 is essentially described first and the operation of the mould system 1 by means of FIGS. 1-3. Regarding the collar ring and the seal ring, the mould systems shown in FIGS. 2A and 2B are not the same as those used in the invention, but they can illustrate the basic structure of the mould system according to the invention.

Figure 1:
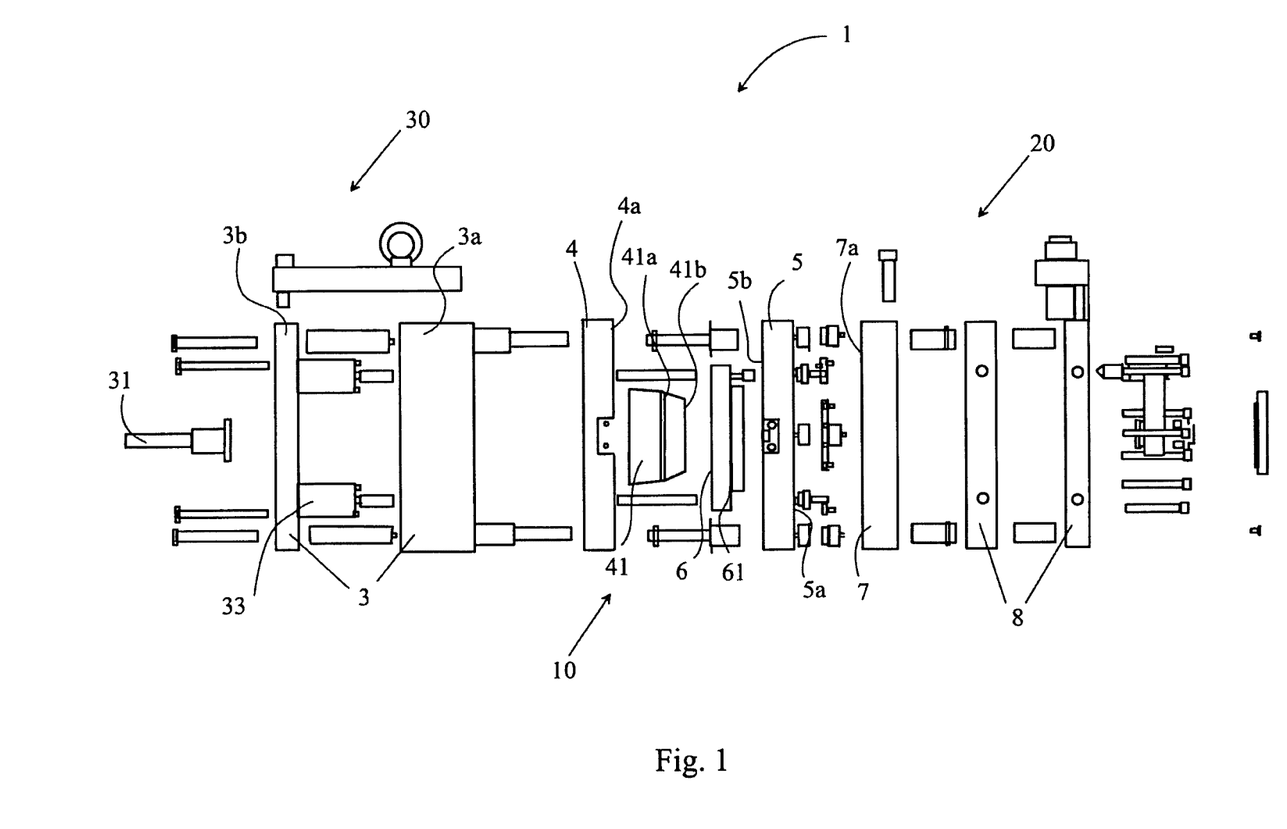
FIG. 1 is an exploded, cross-sectional side view of the mould system.
Figure 2A:
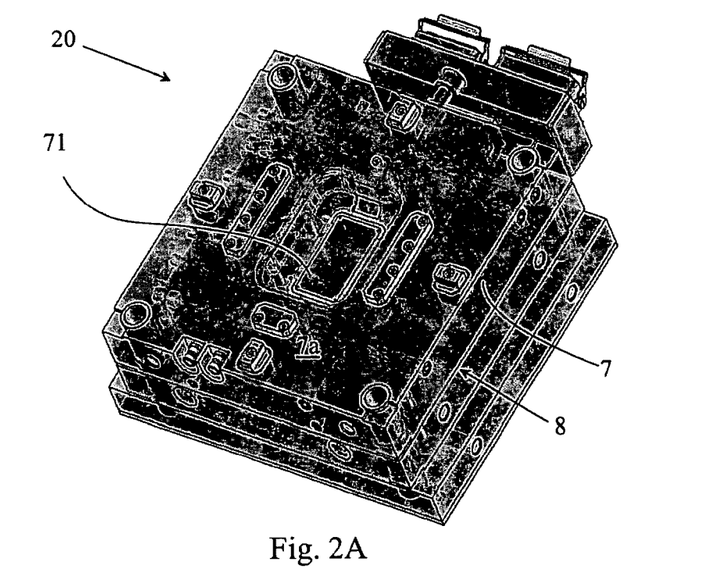
FIGS. 2A and 2B are perspective views of a mould system according to the prior art.
Figure 2B:
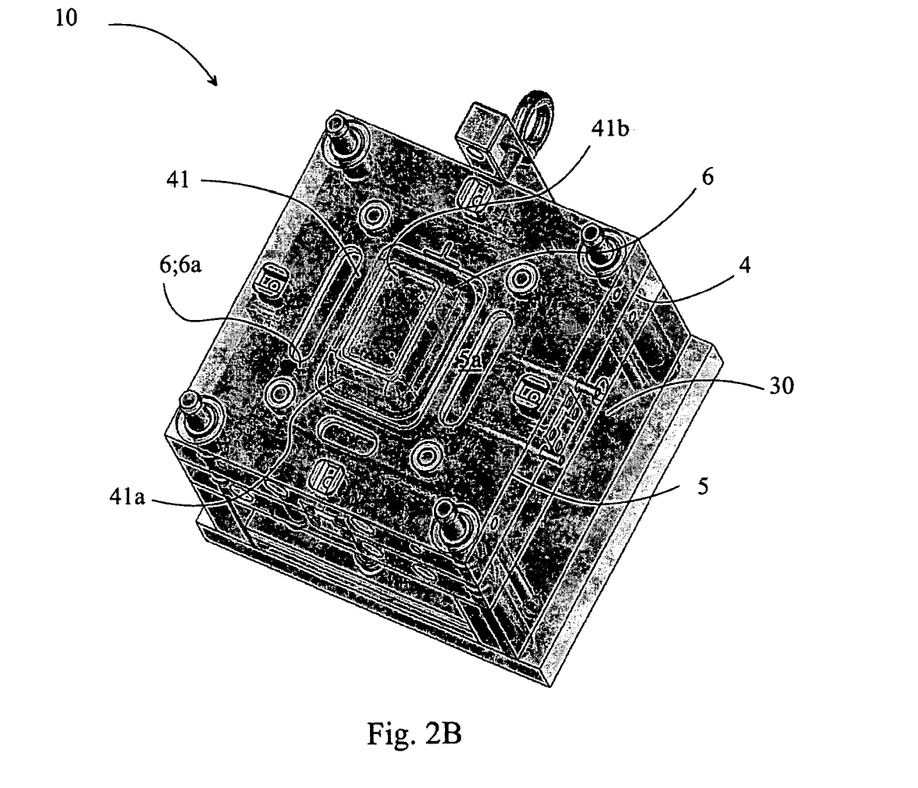

FIG. 1 is an exploded view of the main parts of the mould system according to the invention as viewed from the side and in cross section. The mould system 1 includes a movable mould half 10 or "rear mould" and a stationary mould half 20 or "front mould". The main parts of the movable mould half 10 comprise an ejection part 30 that comprises an ejection bar 31 and the two-piece body 3 of the ejection part, comprising between the parts 3a, 3b of the body, a pneumatic actuator 33 for providing compression between the mould halves 10 and 20. The movable mould half 10 further includes a plate-like seal ring 5, a plate-like collar ring 6 and a core plate 4, to which a (forming) core 41 is attached. The stationary mould half 20 includes a core plate 7, which comprises a mould cavity, against which the planar cardboard blank is shaped and which determines the general shape of the package (bottom, shape of side walls extending from bottom, inclination of walls, roundings etc.). The cardboard blank herein refers to a cardboard blank or a cardboard-based blank, wherein the cardboard is possibly coated with layers of plastic or metal to change its barrier properties. Furthermore, the stationary mould half 20 includes a mould frame 8, through which casting conduits are conveyed to the casting spot of the rim in a manner better shown in FIG. 2B.

Figure 2C:
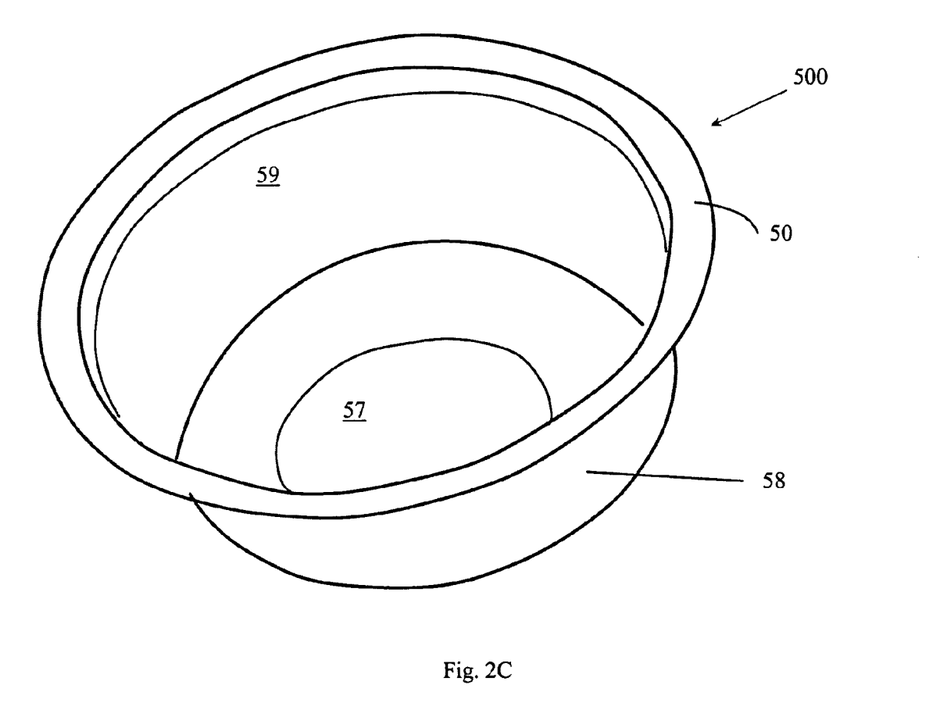
FIG. 2C is a perspective view of a container provided by a known mould system.

The seal ring 5 has a plate-like shape and it surrounds the forming core 41 annularly and concentrically. A collar ring 6, which is movable in the depth direction with respect to the seal ring 5 and the forming core 41 and which is concentric with them, can be arranged between the seal ring 5 and the forming core 41. The depth direction herein refers to the longitudinal direction of the core 41, which is perpendicular to the direction of the surface 4a of the core plate 4. The seal ring 5 comprises a seal surface 5a, which becomes flush with the face 41a of the moulding part of the core 41 at the compression stage (at the end of the compression). The face of the moulding part refers to the part of the core 41, which comes to the plane of the rim of the formed container, i.e., about to the plane of the seal surface 7a of the mould plate 7 and, at the same time, of the upper edge of the mould cavity 71. The moulding part of the forming core 41 shown in FIG. 1 is the part of the core 41, which can be fitted into the mould cavity 71. The moulding part of the forming core 41 shown in FIG. 1 and the corresponding mould cavity 71 have cross-sectional profiles of the shape of a rounded rectangle, whereby they can provide, correspondingly, a container that has a cross section of a rounded rectangle, which is shown, e.g., in FIG. 5A. The cross-sectional profiles of the mould cavity, forming core and container refer to the cross sections as examined in the depth direction of the mould system 1, i.e., perpendicular to the plane of the surface of the mould plate 7 and the core plate 4. If the cross-sectional profiles of the moulding part of the forming core and the mould cavity are changed, e.g., into the form of a circle, containers with a circular cross section are obtained, respectively, as shown, e.g., in FIG. 2C.

The seal surface 5a of the seal ring 5 is opposite to the corresponding seal surface 7a of the mould plate 7 that surrounds the mould cavity 71 of the front mould 20. The core 41 is further surrounded by the collar ring 6, which is capable of carrying out a short reciprocating motion with respect to the seal surface 5a of the seal ring 5, and the face 61a of the collar 61 of the collar ring 6 that is turned to the stationary mould half 20 can be moved to the plane of the seal surface 5a of the seal ring 5 and to a very short distance backwards from it, away from the stationary front mould.

FIG. 2A shows the stationary mould half 20 that is used in a known mould system 1B and FIG. 2B shows the corresponding movable mould half. Regarding its functions and its mould structure, this mould system 1B is of the same type as the one according to the invention, its structure mainly deviating from the mould system according to the invention with respect to the structure of the seal ring 5 that surrounds the core 41 and that of the collar ring 6. In the stationary mould half 20, in its front, there is the mould plate 7 that comprises a recess with the shape of a tray, i.e., the mould cavity 71. The mould plate 7 of the stationary mould half 20 is attached to the mould frame 8, through which the casting conduits, i.e., hot channels and nozzles are introduced. The movable mould half 10, in turn, comprises the forming core 41 in the front, which is attached to the core plate 4 below the same. The core plate 4 is attached to the ejection part 30 of the movable mould half 10. The core 41 is surrounded by the plate-like collar ring 6, which extends to the plane of the face 41a of the core moulding part and the seal surface 6a of which is flush with the face of the core, and by the plate-like seal ring 5, which comprises the seal surface 5a and is located outside the collar ring and limited to the collar ring.

Figure 3A:
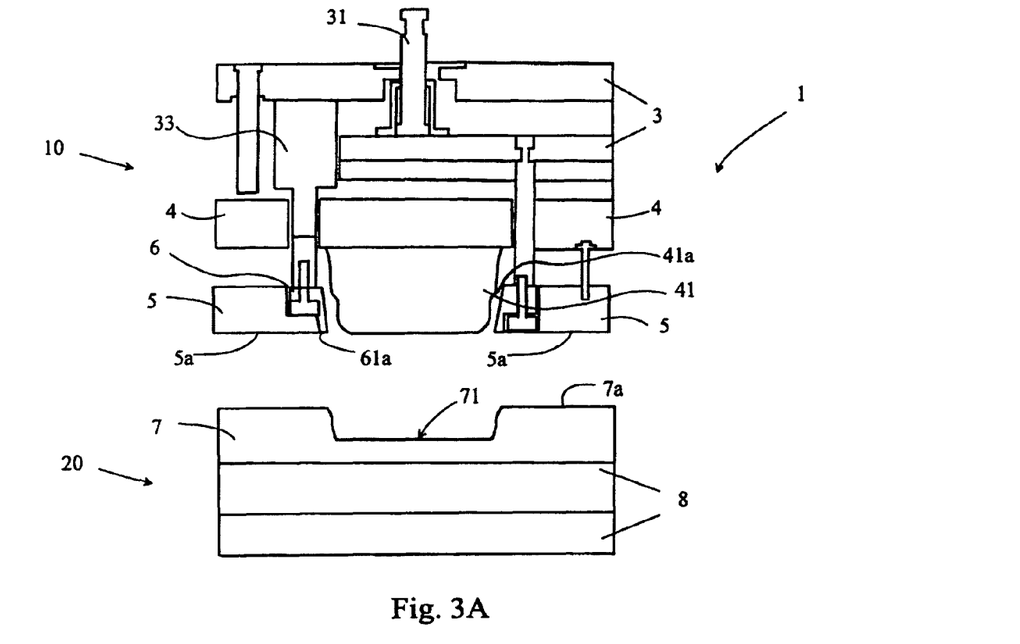
FIGS. 3A-3D show a longitudinal section of the operation of the mould system at the manufacturing stages of the various parts of the container.
Figure 3B:
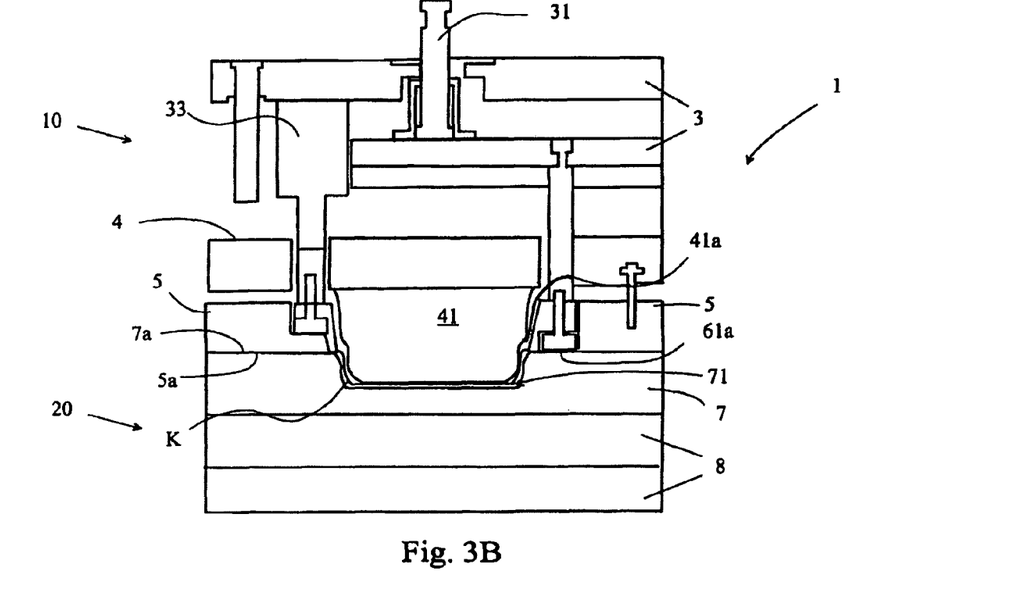

FIGS. 3A-3B show a cross-sectional side view of the mould system 1 according to the invention, its mould halves being the same as those described above in connection with FIGS. 1, 2A and 2B. The mould system 1 is used for forming the tray package, starting from pressing the package and ending in casting the rim. The mould system 1 comprises a compression moulding and casting mould, which is formed from two mould halves 10, 20 and the purpose of which is, at a first stage, to mould a container-shape tray package from an essentially straight and uniform cardboard blank K. A casting function is also integrated into the mould system 1 for casting a rim 50 on the edges of the walls of the package 500 that is shaped by compression.

When the seal surface 61a of the collar 61 of the collar ring 6, i.e., the face 61a that is turned to the stationary mould half 20 is flush with the seal surface 5a of the seal ring 5, a common seal surface is formed by the seal surface 5a of the seal ring and the face or the seal surface 61 of the collar 61. When the mould is closed (the mould halves 10 and 20 are brought together) according to FIGS. 3B-3D, the seal surface 7a of the mould plate 7 of the stationary mould half 20 and the common seal surface 5a, 61a of the movable mould half 10 come against each other, so that the cardboard blank K to be shaped remains between them. The pneumatic actuator 33 between the parts 3a, 3b of the body 3 of the ejection part 30 is connected to the collar ring 6 and it pressurizes, through the collar ring 6, the seal ring 5 and, thus, the common seal surface 5a, 61a of the movable mould half 10 to provide a holding force between the mould halves 10 and 20, i.e., between the common seal surface 5a, 61a and the seal surface 7a of the stationary mould half. The main part of the compression or holding force exerted on the seal surface 7a and, besides, on the cardboard blank K between the seal surfaces 7a, 5a and 61a, is generated by the seal surface 5a of the seal ring 5, but the seal surface 61a of the collar 61 of the collar ring also exerts holding force on the cardboard blank K. The holding force can be adjusted by means of the actuator 33, such as a compressed air cylinder, which works on a pressure medium. The collar ring 6 is located inside the ejection part 3 between the seal ring 5 and the core 41.

The two-piece body 3 of the ejection part 30 and the core plate 4 that comprises the core 41 can be moved by the ejection bar 31 in the depth direction with respect to the stationary mould half 20, whereby the depth direction refers to the same as above. The movable mould half 10 thus moves between a front position (shown in FIG. 3A) and a rear position (shown in FIGS. 3B-3D).

At the compression stage, the movable mould half 10 in the mould system presses the cardboard blank A into the mould cavity 71 of the mould plate 7 of the stationary mould half 20. For this, the movable mould half comprises the forming core 41 that is located on the core plate 4, its forming part fitting into the above-mentioned mould cavity 71 up to the face 41a of the core, so that the cardboard blank is pressed between the core 41 and the cavity 71, obtaining its tray shape. The movable mould half 10 is arranged to move with respect to the stationary mould to close and open the mould by arrangements that are not described herein in detail.

FIG. 3A shows the mould system 1 before closing the mould. The cardboard blank K is brought by a robot to the small holders (not shown) on the mould plate 7 of the stationary mould half 20. After this, the mould is closed, i.e., the core 41 settles into the mould cavity 71 and the cardboard blank K remaining between them is pressed into a tray-shape container.

The stage, at which the core 41 begins to shape the blank after settling into the cavity 71, is shown in FIG. 3B. The seal surfaces, i.e., the seal surface 5a of the seal ring and the seal surface 61a of the collar ring lean on the cardboard blank K by the force of the actuator 33 and retain the blank K at its edges at the compression stage between the said seal surfaces 5a and 61a and the seal surface 7a of the mould plate 7 of the stationary mould half.

Figure 3C:
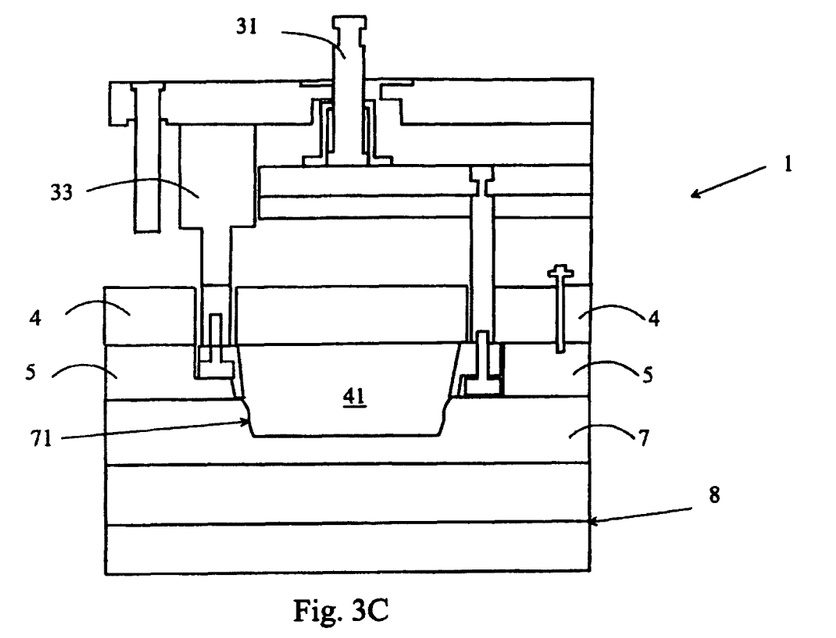

FIG. 3C shows a situation, where the mould is fully closed, the mould halves 10 and 20 being pressed against each other and the cardboard blank K between them is pressed into a tray, so that the upper edge of the side walls of the tray is flush with the seal surface 61a of the collar ring 6 or slightly in front of it. The last holding force on the edges of the blank is caused by the face 61a of the collar 61 of the collar ring 6, against which there is the seal surface 7a of the mould plate that surrounds the cavity 71 of the stationary mould half.

Figure 3D:
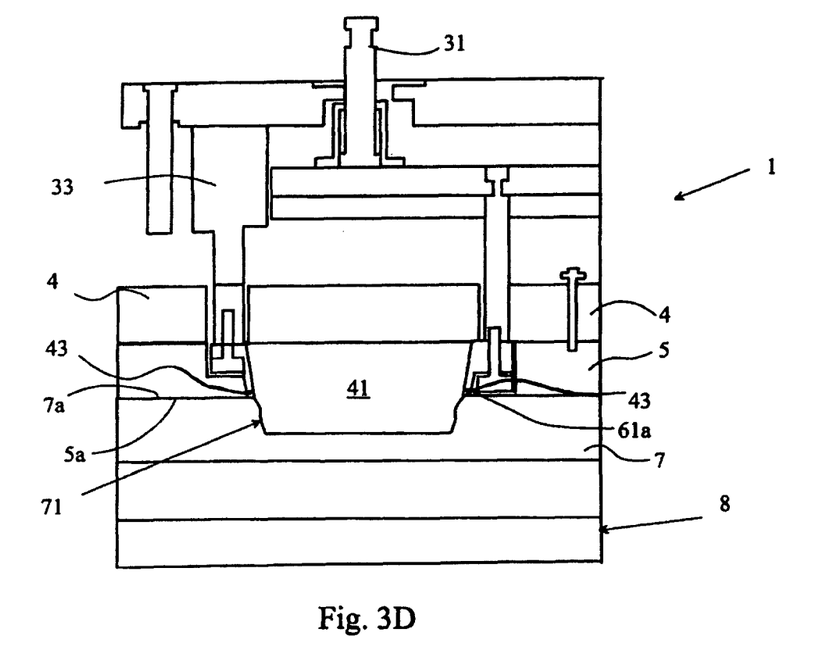

FIG. 3D shows a situation, where the mould is still closed, but the collar ring 6 has moved a short distance backwards from the seal surface 71a of the stationary mould half 20, i.e., in the direction of the ejection part 3 of the movable mould half 10. The movement is provided by an actuator performing precise movements, e.g., by pulling the ejection bar 31 by an ejection motor. A small casting cavity 43 then remains between the seal surface 7a that surrounds the cavity 71, the seal surface 5a of the seal ring 5, the face 61a of the collar 61 of the collar ring 6 and the face 41a of the core 41, being in contact with the outer edge of the tray, encircling the tray annularly. When the molten plastic material is fed into this casting cavity 43, it forms a flange-like rim that extends outwards from the side walls of the tray. Due to its shape, the collar ring 6 is tightened against the forming core 41 to ensure the tightness of the casting cavity 43. The injection channel of the casting material is arranged through the mould frame 8 of the stationary mould half 20, e.g., as shown in FIG. 2B, and the plastic to be cast moves through there to the casting cavity 43. The injection channels can also be arranged to arrive in the injection cavity in another manner, depending on the structure of the container that is shaped.

After the molten plastic material has solidified in the casting cavity 43, the mould can be opened to its open position again. The ejection part 3 is then still in the rear position. When the ejection part 3 is pushed by the ejection rod 31 to the front position, it removes the finished container from the moving mould half 10 and, at the same time, the collar ring 6 can be moved to the front position again, i.e., the position shown in FIG. 3A is reassumed. The seal surface 7a of the mould plate 7 of the front mould 20 then works as ejection surface, against which the ejection bar 31 pushes, when the finished container is removed from the mould. After this, the robot takes the finished container out and replaces it with a new blank K, after which the working phases are repeated as above.

Figure 5A:
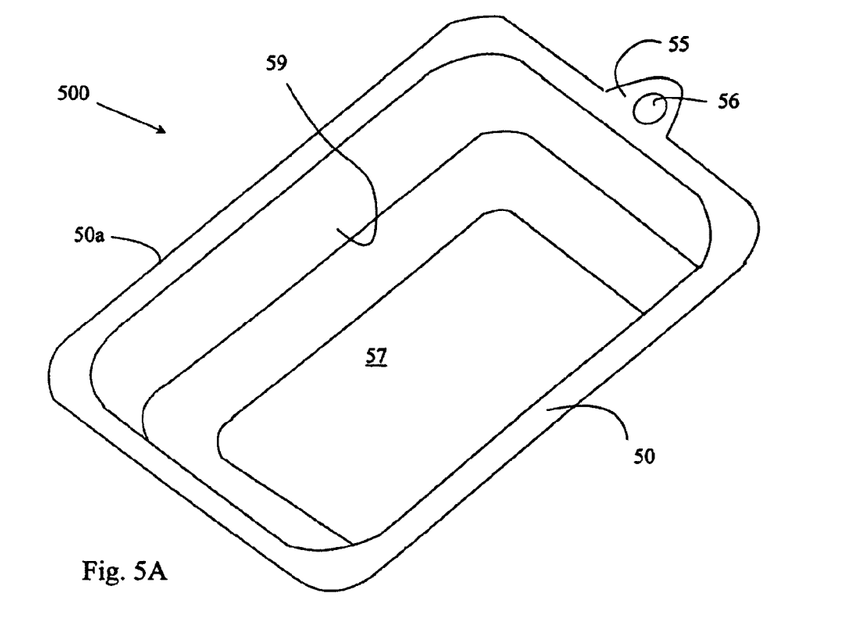
FIGS. 5A and 5B are perspective views of the containers provided by the rear mould according to the invention.

If there were neither a suspension means 56 nor a projection 55 of the basic rim in the tray-shape container 500, which is shown in FIG. 5A and which consists of a cardboard or coated cardboard tray frame, i.e., bottom 57 and walls 59, which are connected to the bottom and extend upwards from the bottom plane, and a plastic flange-like basic rim 50 that encircles the upper edge of the walls 59 of the frame and extends outwards, it could be manufactured by the so-called basic casting method described above. However, when various decorative or functional shapes, suspension means or rims with different widths are to be formed on the basic rim 50 of the tray-shape container 500 according to FIG. 5A by the same front and rear moulds, the collar ring 5 or the sealing ring 6 must be modified to provide them.

Figure 4A:
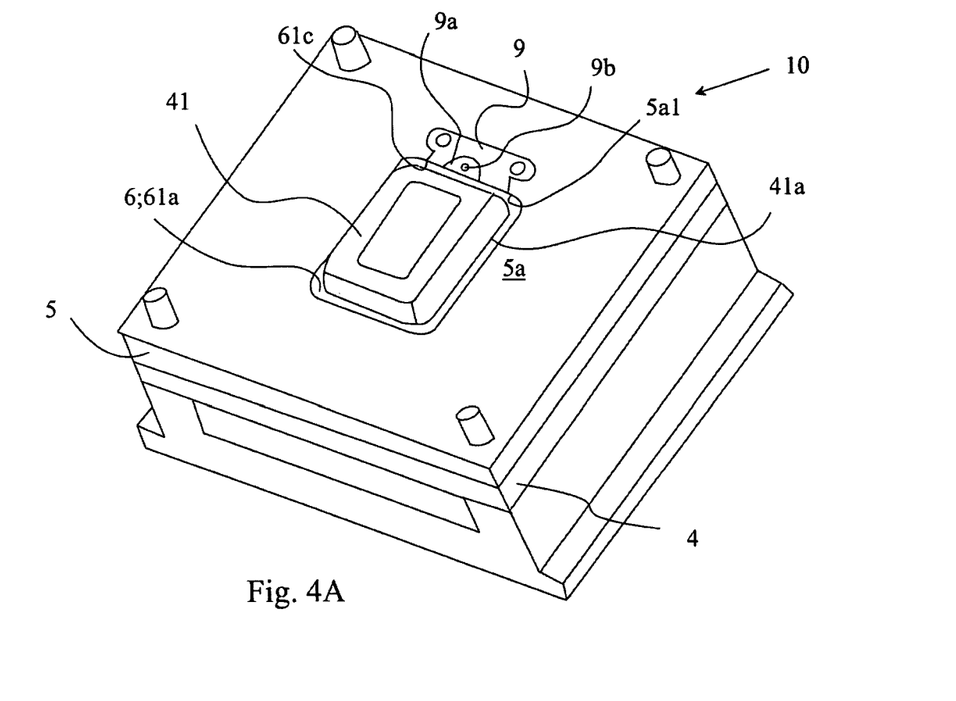
FIG. 4A is a perspective view of the parts of the rear mould according to an embodiment of the invention.

The rim of the container 500 according to FIG. 5A is modified with respect to the standard model (e.g., FIG. 2C) by forming therein, by the mould system 1, a projection 55, through which a suspension opening 56 goes and which is connected to the outer edge 50a of the annular basic rim 50. Such a projection 55 can be provided by the rear mould 10 according to FIG. 4A, which differs from the rear mould 10 shown in FIG. 2B in that an insert 9 is attached to the seal surface 5a of the sealing ring 5, on its front edge 5a1, next to the seal surface 61a of the collar ring 6. This insert comprises a recess 9a of the shape of the intended projection 55, and the recess comprises a round bulge 9b of the shape of the suspension opening 56 that comes to the container. The projection 55 of the basic rim 50 is cast on the container 500 simultaneously with casting the basic rim 50. The molten plastic flows into the casting cavity 43 in a manner similar to that illustrated in FIG. 3D; however, the cavity now consisting of a space, which is limited by the seal surface 7a of the mould plate, the seal surface 61a of the collar ring 6, the face 41a of the core 41 and the recess 9a of the insert 9 on the seal surface 5a of the seal ring 5 and the rest of the seal surface 5a of the seal ring. By such a casting cavity 43, the basic rim 50 and, simultaneously, also the projection 55 that is an extension of the basic rim 50 are formed on the container.

Figure 4B:
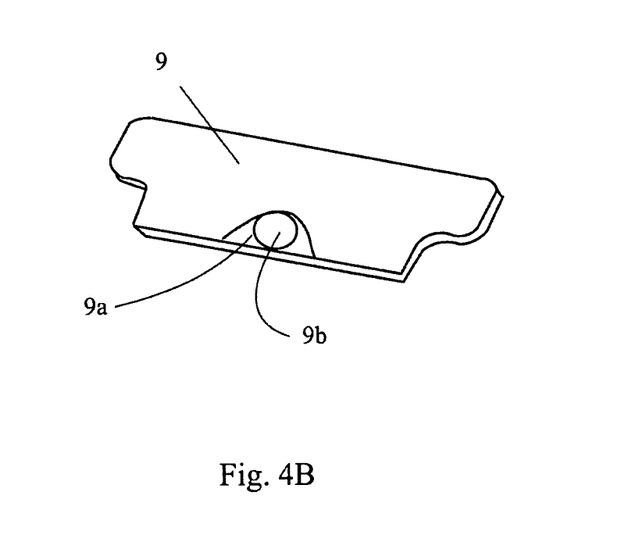
FIG. 4B is an enlarged view of the insert of the rear mould according to FIG. 4A.
Figure 5B:
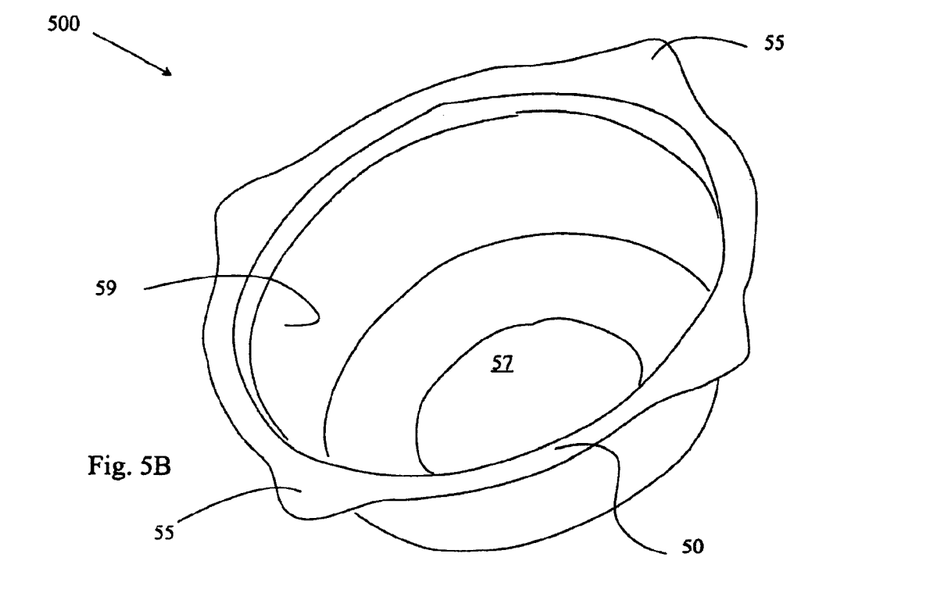

A rear mould 10 similar to that shown in FIG. 4 can also be used in manufacturing the container 500 shown in FIG. 5B, which has a round bottom and an annular cross section of the wall 59, several projections 55, which have a cross sectional profile of the shape of a circular arch, being attached to the basic rim 50 that encircles the upper edge of the container wall 59 and has the shape of a ring. Such a container with the shape of a round-bottom cup is formed by the mould system 1, the base of the mould cavity 71 of the front mould 20 of the system being circular and the shape of the mould cavity walls having an annular cross-sectional profile, thus corresponding to the shape of the cup walls 59. The cross section of the forming part of the forming core 41 of the rear mould that is fitted into the mould cavity 71 is also circular and the shape of its outer surface 41b that shapes the container bottom is also circular, thus corresponding to the shape of the mould cavity bottom. The flange-like basic plastic rim 50 can be made on the container by the method described above by introducing molten plastic into the casting cavity 43 between the seal surface 61a of the collar ring 61, the seal surface 5a of the seal ring 5 and the seal surface 7a of the mould plate 7 and the face 41a of the core through the casting conduits in the front mould. The basic ring 50 is now modified by attaching, to the seal surface 5a of the seal ring 5, a number of inserts 9, which are provided with recesses 9a and which have the shape of the insert 9 shown in FIG. 5A, but which do not necessarily have the blank of the suspension means 9b that is located in the recess 9a, however. The inserts 9 are attached so that each insert is limited to the annular front edge 5a1 located in the front part of the annular seal surface 5a of the seal ring 5. When the seal surface 5a of the seal ring is flush with the face 61a of the collar of the collar ring 6, the insert 9 is limited to the outer edge 61c of the seal surface 61a of the collar 61 (i.e., the insert 9 begins from the edge 5a1 of the seal surface 5a of the seal ring on the side of the collar 6). The inserts 9 are located in the front part of the seal surface 5a of the seal ring, at a regular peripheral distance of the front edge 5a1 of the seal surface 5a from each other. Each insert comprises a recess 9a with the shape of about a semi-circle. When the seal surfaces 5a of the seal ring 5 are provided with such inserts 9, which comprise recesses 9a of semi-circular cross-sectional profiles, a mould cavity 43 is formed at the manufacturing stage of the container corresponding to FIG. 3D, the cavity being limited by the seal surface 61a of the collar of the collar ring 6, the face 41a of the core and the seal surface 71a of the mould plate that comprises the recesses 9 of the semi-circular shape. When the molten plastic flows into the mould cavity 43, the projections 55 of the basic rim 50 shown in FIG. 5B are formed.

Various functional and decorative shapes can also be added to the basic rim 50 of the container 500, as well as shapes and ridges that extend upwards from the edge. The shapes are provided by connecting a raising collar 612 that is used as insert to the annular basic collar 61; 611 of the collar ring 6. This raising collar consists of a similarly annular raising collar 61; 612 that is detachably attached on top of the annular basic collar 61; 611. These raising collars 612 that are attached to the basic collar 611 of the collar ring 6 are shown in an exemplary manner in FIGS. 6A-6C, and various modifications of the rim 50 of the container 500 that are provided by the raising collars are shown in FIGS. 7A-7D, respectively. The shape A of the opening in the middle of the collar ring 6 and the collar may vary, which is why the concept "annular" in connection with the collar ring or the collar or parts of the collar (raising collar or basic collar) mainly means that there is an opening in the middle of the body of the part in question. When viewed from above, the body 62 of the collar ring 6 can have a cross-sectional profile of a round, rectangular or other shape, and in the middle of the body 62, there is an opening A of a round, rectangular or other shape. The shape of the opening A defines the shape of the collar 61 that encircles its edges.

The raising collar 612 should fit tightly on top of the basic collar 611; therefore, when examining the collar ring from above, the cross-sectional profiles of the basic collar 611 and the raising collar 612 should be congruent at least at the junction of the basic collar 611 and the raising collar 612. The seal surface 61a of such a collar ring 6 that is provided with the raising collar 612 is then the same as the upper surface 612a of the raising collar 612. The seal surface 612a of the raising collar is now provided with recesses, which correspond to these desired functional or decorative shapes of the rim, or with very low and wide bulges or decorative embossed patterns or bulges located in the recesses, which do not yet extend higher than the rest of the plane of the seal surface. When the molten plastic flows into the casting cavity 43, when the container rim 50 is cast at the working phase according to FIG. 3D, the seal surface 612a of the raising collar 612, which works as a wall that limits the casting cavity on one part thereof, forms bulges on the rim 50 that is formed, and recesses between these bulges, which recesses are on about the plane of the rest of the rim surface. The shapes, which are formed on the rim 50 of the container 500 and which extend upwards from the rest of the plane of the rim surface, can be changed by simply replacing the old raising collar 612 on the basic collar 611 with a new raising collar, on the seal surface 612a of which the desired formations are located. When so desired, the raising collars 612 can also change the width I of the rim by changing the width I of the seal surface 612a of the raising collar 612, whereby the size of the opening in the middle of the seal plate 5 that comes next to the seal surface of the raising collar at the casting stage of the rim must then also be changed, respectively, e.g., by adding to the seal plate or removing from the same a suitable insert.

Figure 6A:
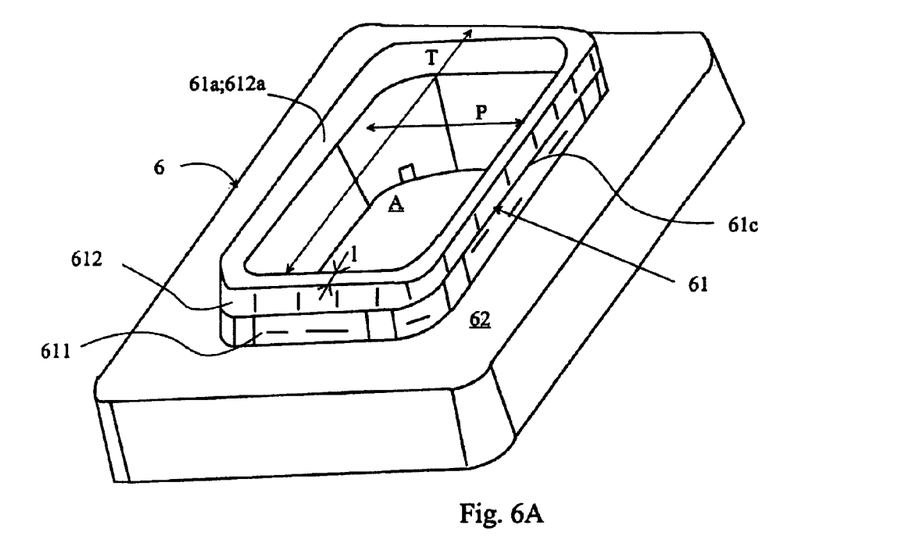
FIGS. 6A and 6B 6C are perspective views of the collar ring alternative of the mould system according to the invention.
Figure 6B:
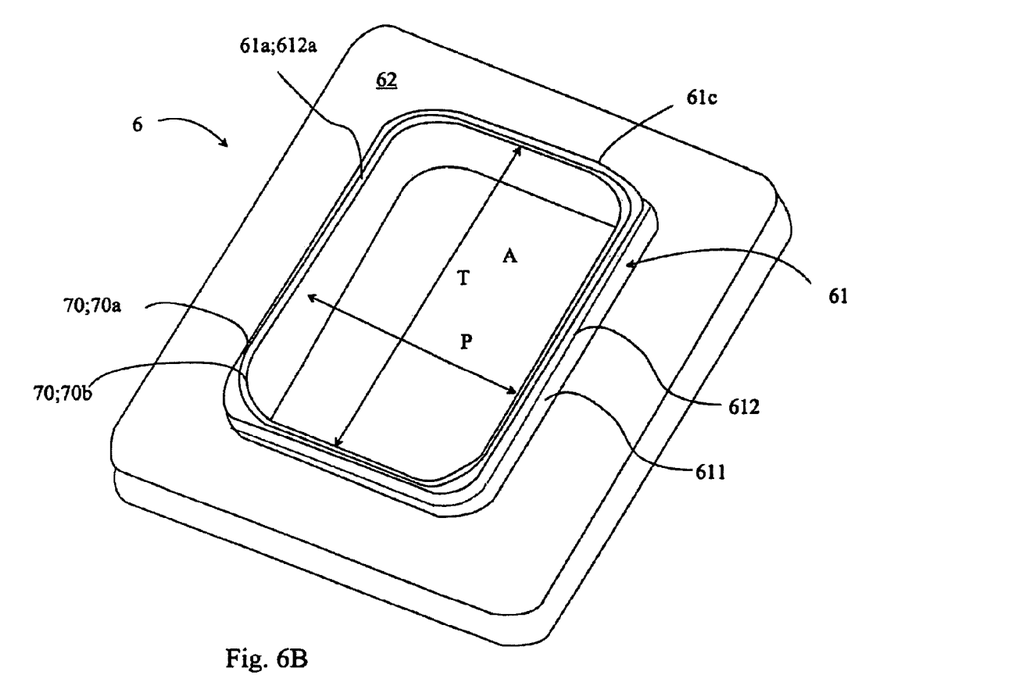
Figure 6C:
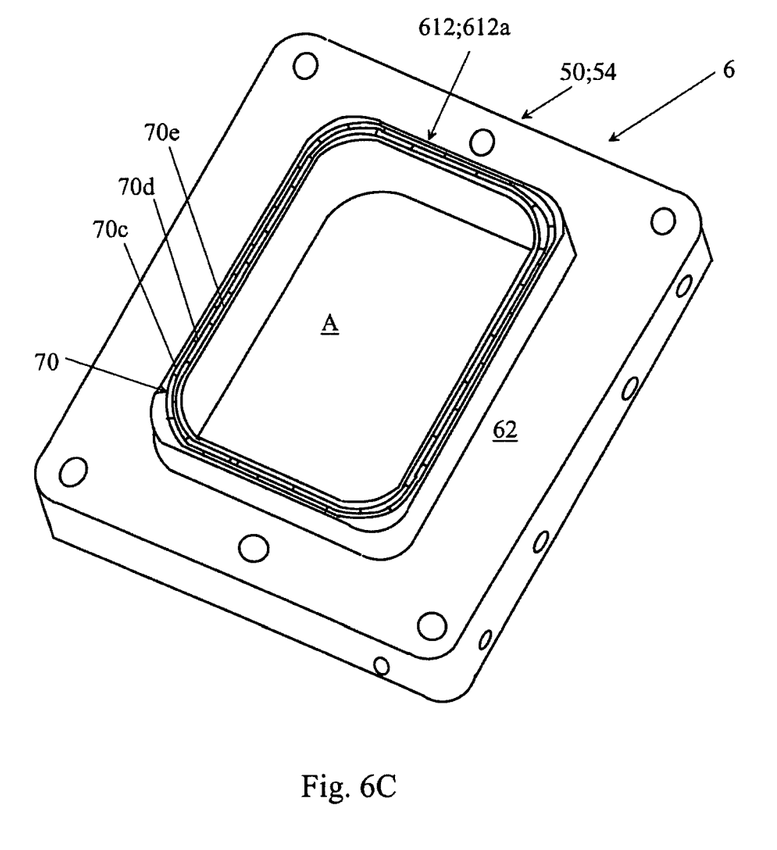
Figure 7A:
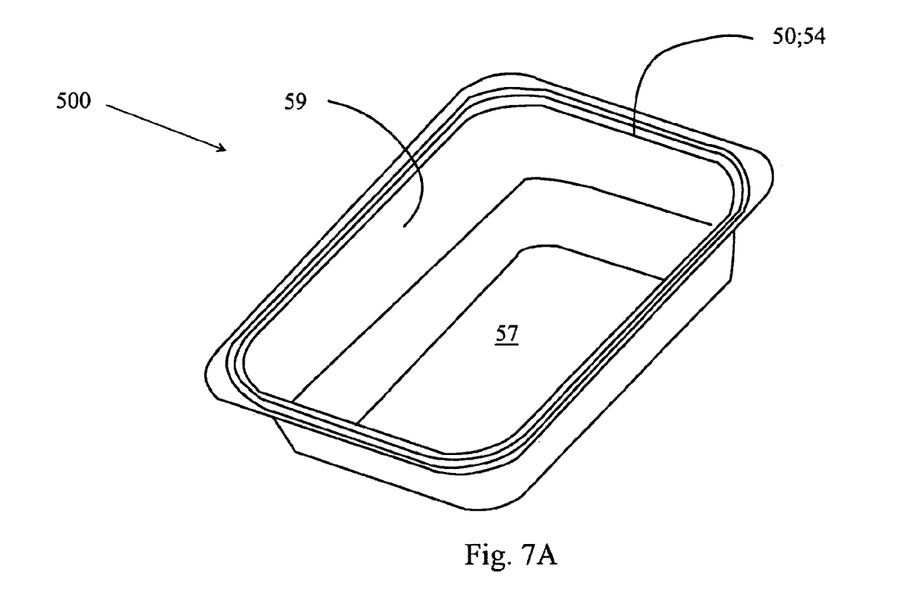
FIG. 7A is a perspective view of the containers provided by the collar ring according to FIG. 6B.
Figure 7B:
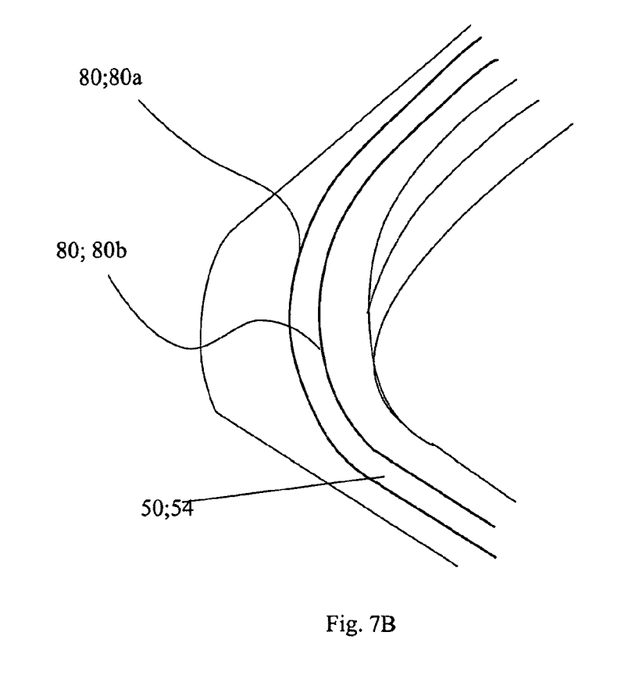
FIG. 7B is an enlarged top view of one corner of the edge of the container according to FIG. 7A.
Figure 7C:
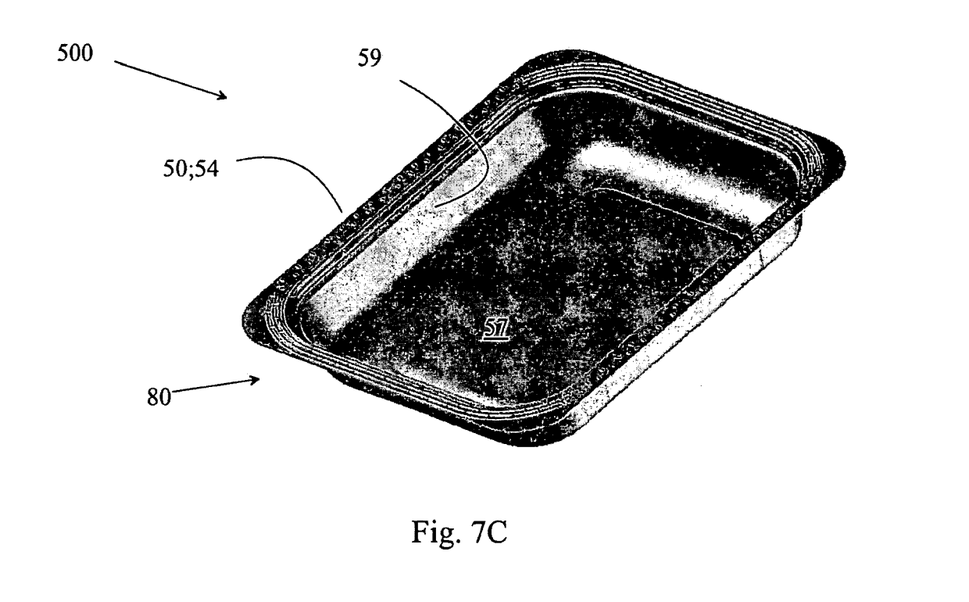
FIG. 7C is a perspective view of containers provided by the collar ring according to FIG. 6C.
Figure 7D:
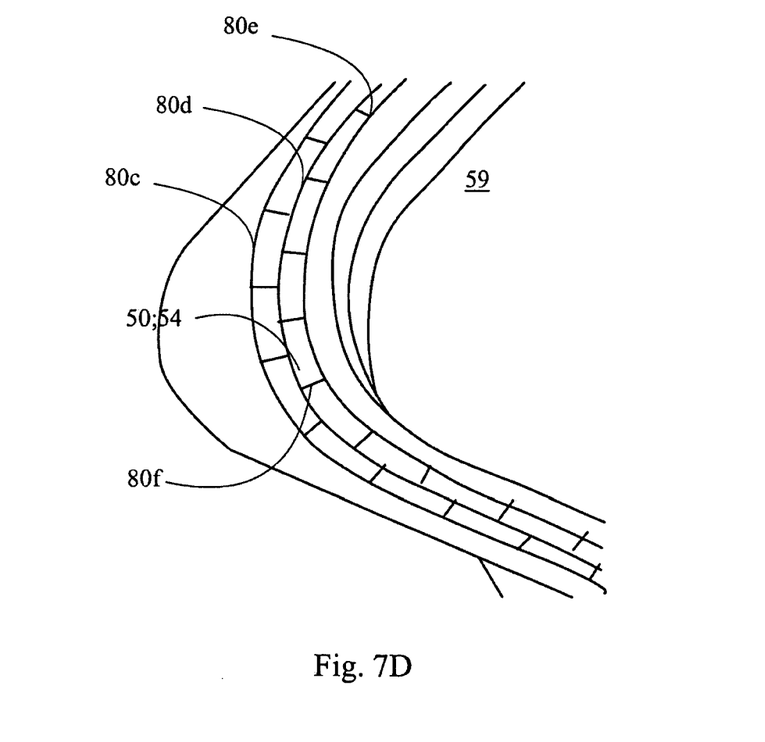
FIG. 7D is an enlarged top view of the corner of one edge of the container according to FIG. 7C.

FIG. 6A shows a collar ring 6, which has a body 62 with the shape of a rectangle with rounded corners; a collar 61, which also has a general shape of a rounded rectangle and a width T and a length P, encircling the edge of the rectangular opening A that is in the middle of the collar ring, the collar extending upwards from the plane of the body 62 of the collar ring. The width T and length P refer to the dimensions of the collar inner diameters and, as well, the inner dimensions of the edge of the opening A. The collar 6 consists of a lower basic collar 611, which is attached to the plate-like body 62 of the collar ring, and an insert, the raising collar 612, which is attached on top of the basic collar 611. Both the raising collar 612 and the basic collar 611 are of the same shape and their width and length dimensions in the direction of the plane of the body 62 of the raising ring 6 are the same. The raising collar 612 can be attached to the basic collar by a suitable joint that can be opened, such as a screw joint or a mortise joint. FIG. 6B shows a collar ring 6, two grooves 70; 70a, 70b that encircle the seal surface 612a of the raising collar being formed on the seal surface 612a that is on top of its raising collar 612. These grooves 70a and 70b, respectively, provide the basic rim 50; 54, which is modified on the container 500 according to FIGS. 7A and 7B and in which two parallel ridges 80; 80a and 80; 80b that extend slightly upwards from the plane of the rim encircle the container rim 50; 54. FIG. 6C shows a collar ring 6, on the seal surface 612a of the raising collar 612 of which three grooves 70; 70c, 70d, 70e are formed, encircling the annular seal surface 612a of the raising collar in parallel. Between the adjacent grooves 70, recesses are located at regular intervals from each other and transversally to the direction of the grooves. The transversal recesses between the grooves and the grooves themselves thus together constitute a ladder-type groove/recess grooving. The seal surface 612a of the collar ring that is provided with such a ladder-type grooving can be used to make the containers 500 shown in FIGS. 7C and 7D, the modified rim 50; 54 of which is encircled by three parallel ridges 80; 80c, 80d, 80e that extend slightly upwards from the rest of the plane of the container rim, cross ridges 80f transversal to the direction of these ridges 80 being provided between them. Corresponding depressions run between the ridges 80c, 80d, 80e, 80g of the rim, being approximately on the plane of the rest of the rim surface.

The invention is illustrated above by a few exemplary embodiments only and it is obvious to those skilled in the art that the invention can also be implemented in various other ways within the scope of the invention disclosed in the claims.

For example, the width of the plastic rim 50 that is cast on the container 500 can be changed by a collar ring 6, the raising collar 612 of which comprises a seal surface 612a wider than the basic collar 611. The size of the seal ring opening is then also changed, correspondingly.

The invention claimed is:

1. A mould system for manufacturing a container pressed from a cardboard blank and containing walls connected to a bottom portion and a rim that is at least partially cast of a plastic material and connected to and encircling the upper edge of said walls, which comprises:
   a movable mould half and a stationary mould half which are positioned opposite to each other, said movable mould half being movable relative to the stationary mould half, wherein the movable mould half includes at least a core plate provided with a core, a plate-like seal ring, which is movable relative to the core, a seal surface which surrounds the core, and a collar ring which is movable relative to the core and to the seal ring and disposed therebetween, and
   the stationary mould half which includes at least a mould plate, which is provided with a mould cavity and a seal surface, wherein the mould system includes a raised collar which is detachably connected to the top of a basic collar of the collar ring of the movable mould half, wherein a seal surface of the raised collar contains grooves or recesses which are disposed lower than the plane of the seal surface, and the grooves or recesses are used to provide, on the plastic rim of the container, ridges or bulges that rise from the plane of said rim, and grooves or recesses which are disposed between said ridges and bulges and which are in the plane of the rim or slightly lower than the plane of the rim.

2. The mould system according to claim 1, wherein the seal surface of the raised collar comprises two or more parallel grooves, between which are provided recesses which join the grooves; the grooves and recesses providing parallel ridges which encircle the plastic rim of the container.

3. The mould system according to claim 1, wherein a raised collar is connected to the top of the basic collar of the collar ring of the movable mould half of the mould system, the width of its seal surface being wider or narrower than the width of the basic collar.

4. The mould system according to claim 3, wherein the size of the opening in the middle of the seal ring of the mould system is fitted so as to correspond to the width of the seal surface of the raised collar.

5. The mould system of claim 1, wherein, on the surface or in the recesses of the seal ring there is provided bulges or embossed patterns which are positioned in the plane of the seal surface or extend slightly upward from said plane, and the bulges or embossed patterns are disposed in these recesses and grooves.

6. The mould system of claim 1, wherein the grooves and recesses which are disposed between said ridges and bulges and which are in the plane of the rim or slightly lower than the plane of the rim, comprise said embossed patterns or bulges.

7. A method of manufacturing a container by the mould system according to claim 1, characterized in that a cardboard blank is pressed between the core (41) and the mould cavity (71) to provide the bottom (57) and walls (59) that encircle the bottom, after which a flange-like rim, which encircles the walls, is formed by casting on the upper edge of the walls by introducing molten plastic into the casting cavity (43), which is limited by the seal surface (7a) of the mould plate, the seal surface (5a) of the seal ring (5) and the seal surface (61a) of the collar ring (6), whereby the shape and/or dimensions of the casting cavity are changed by arranging, on the basic collar (61; 611) of the collar ring, a raising collar (612), which is detachably attached and which changes the operation of the seal ring (5) or the collar ring (6), and by which the surface of the said basic rim (50) is provided with bulges or ridges, which rise from the rest of the plane of the surface (50) of the rim, with grooves or recesses, which are lower than the plane of the bulges or ridges and optionally lower than the plane of the rest of the surface of the basic rim (50).

8. A method according to claim 7, characterized in that the cardboard blank (K) is retained between the seal surface (5*a*) of the seal ring and the seal surface (61*a*) of the collar ring and the seal surface (7*a*) of the mould plate opposite the same at least until the cardboard blank (K) has slid into the mould cavity (71), and the casting cavity is not provided in the mould system until after this for forming the flange-like rim (50) that encircles the container walls and at least partly consists of plastic.

\* \* \* \* \*